United States Patent
Chasse et al.

(10) Patent No.: US 10,061,857 B1
(45) Date of Patent: Aug. 28, 2018

(54) DETECTING AND GROUPING USERS IN ELECTRONIC COMMUNICATIONS

(71) Applicant: INTERNATIONAL BUSINESS MACHINES CORPORATION, Armonk, NY (US)

(72) Inventors: Brenton Chasse, Plainville, CT (US); Andrew Davis, Arlington, MA (US); Cory Gorman, Clinton, MA (US); Zachary Stair, Westborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/904,780

(22) Filed: Feb. 26, 2018

Related U.S. Application Data

(63) Continuation of application No. 15/634,611, filed on Jun. 27, 2017.

(51) Int. Cl.
| | | |
|---|---|---|
| *G06F 15/16* | (2006.01) | |
| *G06F 17/30* | (2006.01) | |
| *H04L 12/58* | (2006.01) | |
| *G06Q 30/02* | (2012.01) | |
| *H04W 4/21* | (2018.01) | |
| *G06Q 50/00* | (2012.01) | |
| *H04L 29/08* | (2006.01) | |
| *H04W 4/80* | (2018.01) | |

(52) U.S. Cl.
CPC ... *G06F 17/30867* (2013.01); *G06Q 30/0269* (2013.01); *G06Q 30/0275* (2013.01); *H04L 51/12* (2013.01); *H04L 51/32* (2013.01); *H04L 67/306* (2013.01); *H04W 4/21* (2018.02); *G06Q 50/01* (2013.01); *H04L 67/02* (2013.01); *H04W 4/80* (2018.02)

(58) Field of Classification Search
CPC ....... H04L 52/12; H04L 67/306; H04L 67/02; G06Q 30/0269; G06Q 30/0275; G06Q 50/01; H04W 4/21; H04W 4/80
USPC ....................................................... 709/206
See application file for complete search history.

(56) References Cited

U.S. PATENT DOCUMENTS

| | | |
|---|---|---|
| 9,319,371 B1 | 4/2016 | Troper et al. |
| 2009/0327438 A1 | 12/2009 | Cheng et al. |
| 2010/0082415 A1 | 4/2010 | Begue et al. |

(Continued)

FOREIGN PATENT DOCUMENTS

| | | |
|---|---|---|
| WO | 2007007410 A1 | 1/2007 |

OTHER PUBLICATIONS

Sanebox, "SaneBox for Business", © 2017, SaneBox, Inc., Last printed May 5, 2017, pp. 1-5, <https://www.sanebox.com/business>.

(Continued)

*Primary Examiner* — Kyung H Shin
(74) *Attorney, Agent, or Firm* — Michael A. Petrocelli

(57) ABSTRACT

A method and system for detecting and grouping users in electronic communications includes detecting electronic communications by a user using a device having a computer to communicate with other users. A number of message recipients are identified in the electronic communications. The message recipients are placed in a social graph based on a criterion such as the frequency of the electronic communications between the user and the message recipients. A group is created of the message recipients based on the social graph, and the group is presented to the user. The group can be accessed by the user for routing future electronic communications.

1 Claim, 9 Drawing Sheets

(56) References Cited

U.S. PATENT DOCUMENTS

2012/0260188 A1   10/2012   Park et al.
2013/0246545 A1    9/2013   Chen et al.
2014/0222933 A1    8/2014   Stovicek et al.
2015/0222651 A1    8/2015   Fidler

OTHER PUBLICATIONS

Mell et al., "The NIST Definition of Cloud Computing", Recommendations of the National Institute of Standards and Technology, NIST Special Publication 800-145, Sep. 2011, 7 pages.
Chasse, et al., "Detecting and Grouping Users in Electronic Communications", U.S. Appl. No. 15/634,611, filed Jun. 27, 2017.
List of IBM Patents and Patent Applications Treated as Related. Filed Feb. 26, 2018. 2 pages.

DETECTING AND GROUPING USERS IN ELECTRONIC COMMUNICATIONS

BACKGROUND

The present disclosure relates to grouping users communicating on an electronic communications platform, for example, electronic mail (email), using cognitive analysis. A user can frequently interact with a distinct group of people using an electronic communications platform to transmit electronic communications, such as email or messaging. Such communications are prevalent in a business environment or socially, and many communications platforms are available, using computers, and electronic device, and mobile devices, such as mobile phones, to communicate using email, messaging, texting and the like. In some cases, a user can have many groups of people that are communicated with at varying intervals of time, for example, daily, monthly, occasionally. The members of the groups of people communicated with can also vary. For example, members can be added or dropped from the group. It is often difficult for the user to interact with the groups when an email client interface operates in terms of individuals and not groups. The user must remember the members of the group or team and manually create groups and lists. This can be time consuming and cumbersome for the user and is prone to error. This can result in group members or team members not receiving important email messages.

SUMMARY

It would be desirable for a method and system to provide intelligent automatic grouping (or team selection) in a communications platform to reduce or eliminate the need for manual selection of members of a group or team in communications, for example, email communications. In one embodiment, the present invention provides a method and system for creating a message group or team based on an analysis of a user's email, and groups message recipients based on a cognitive analysis.

According to an aspect of the present invention, a method can group users communicating on an electronic communications platform using a cognitive analysis of a user's electronic communications. The method includes detecting electronic communications by a user using a device having a computer and connected to an electronic communication system for communicating with message recipients. A number of message recipients participating in the detected electronic communications are identified. A social graph of the identified message recipients is created based on a cognitive analysis of the electronic communications and a set of criteria. The criteria can include a frequency of the inclusion of message recipients in the electronic communications. A group of the most relevant message recipients is created in the user's electronic communications platform. The group is selected from the message recipients and based on the social graph of the message recipients. The group is presented to the user.

In another aspect according to the present invention, a system can group users communicating on an electronic communications platform using a cognitive analysis of a user's electronic communications. The system comprises a computer system comprising: a computer processor, a computer-readable storage medium, and program instructions stored on the computer-readable storage medium, and program instructions stored on the computer-readable storage medium being executed by the processor, to cause the computer system to perform a method, the system includes detecting electronic communications by a user using a device having a computer and connected to an electronic communication system for communicating with message recipients. A number of message recipients participating in the detected electronic communications are identified. A social graph of the identified message recipients is created based on a cognitive analysis of the electronic communications and a set of criteria. The criteria can include a frequency of the inclusion of message recipients in the electronic communications. A group of the most relevant message recipients is created in the user's electronic communications platform. The group is selected from the message recipients and based on the social graph of the message recipients. The group is presented to the user.

In another aspect according to the present invention, a computer program product can group users communicating on an electronic communications platform using a cognitive analysis of a user's electronic communications. The computer program product comprises a computer readable storage medium having program instructions embodied therewith, wherein the computer readable storage medium is not a transitory signal per se, and the program instructions executable by a computer to cause the computer to perform a method, comprising: detecting electronic communications by a user using a device having a computer and connected to an electronic communication system for communicating with message recipients. A number of message recipients participating in the detected electronic communications are identified. A social graph of the identified message recipients is created based on a cognitive analysis of the electronic communications and a set of criteria. The criteria can include a frequency of the inclusion of message recipients in the electronic communications. A group of the most relevant message recipients is created in the user's electronic communications platform. The group is selected from the message recipients and based on the social graph of the message recipients. The group is presented to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
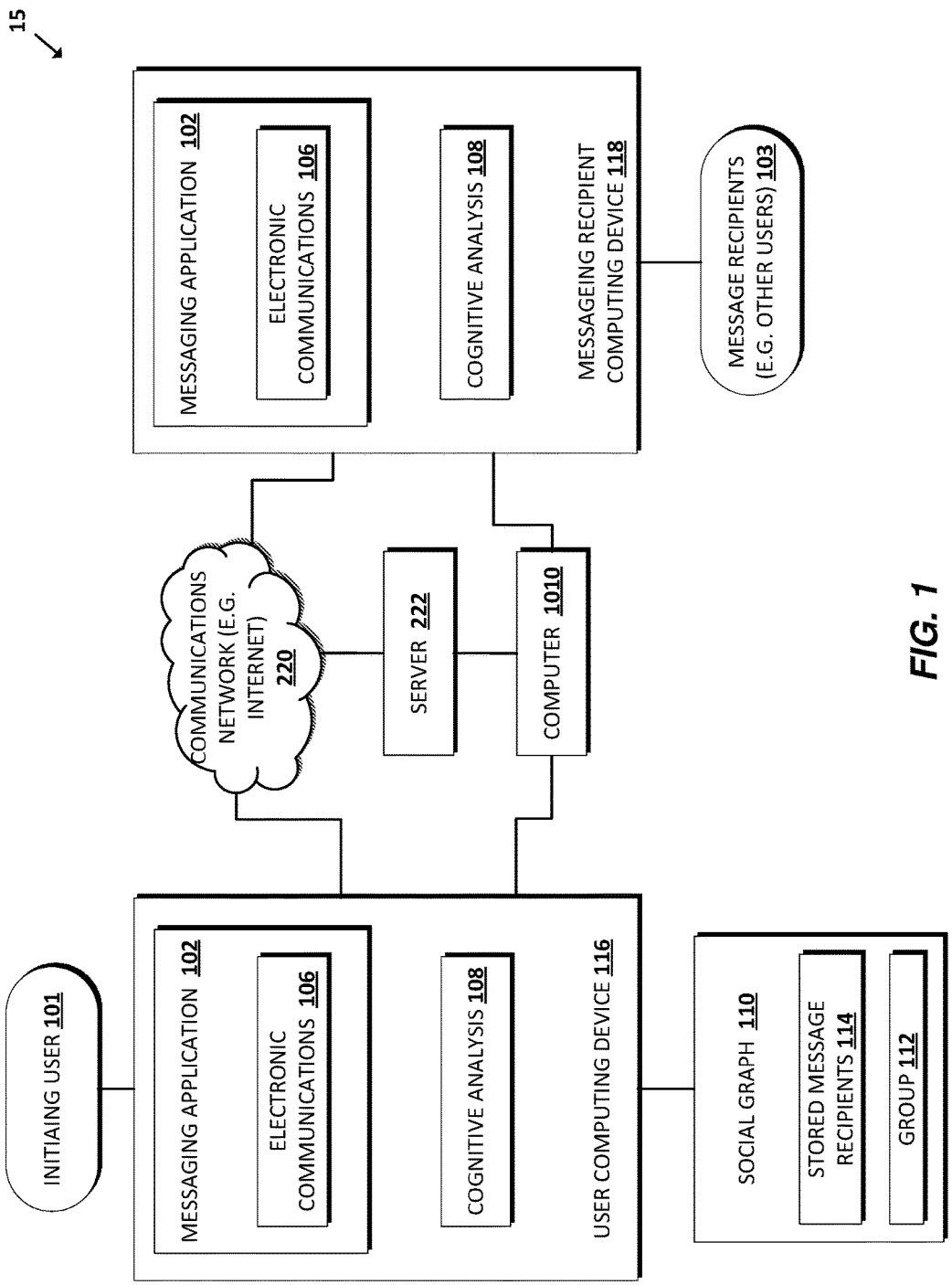
FIG. 1 is a schematic block diagram illustrating an overview of a system and methodology for grouping users communicating on an electronic communications platform using a cognitive analysis.
Figure 2:
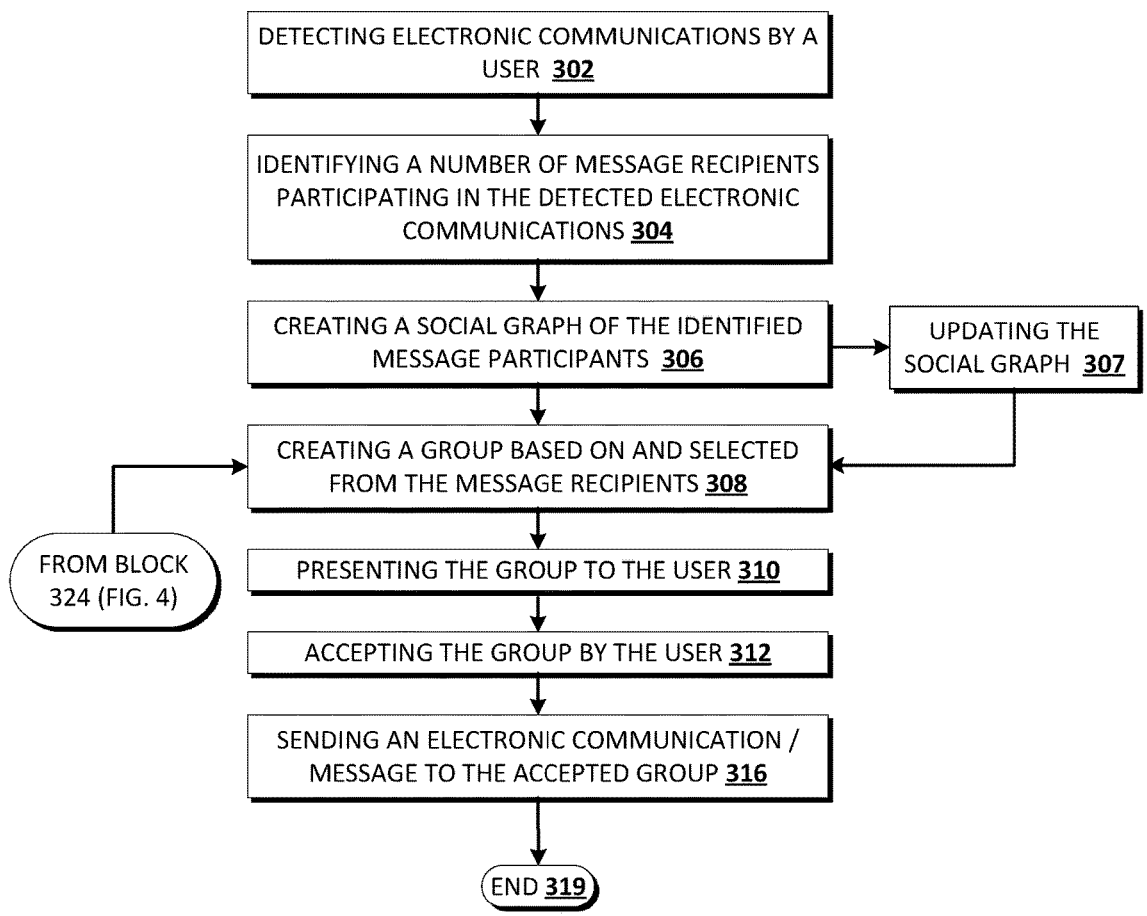
FIG. 2 is a flow chart depicting a method using the system shown in FIG. 1 according to an embodiment of the present disclosure.
Figure 3:
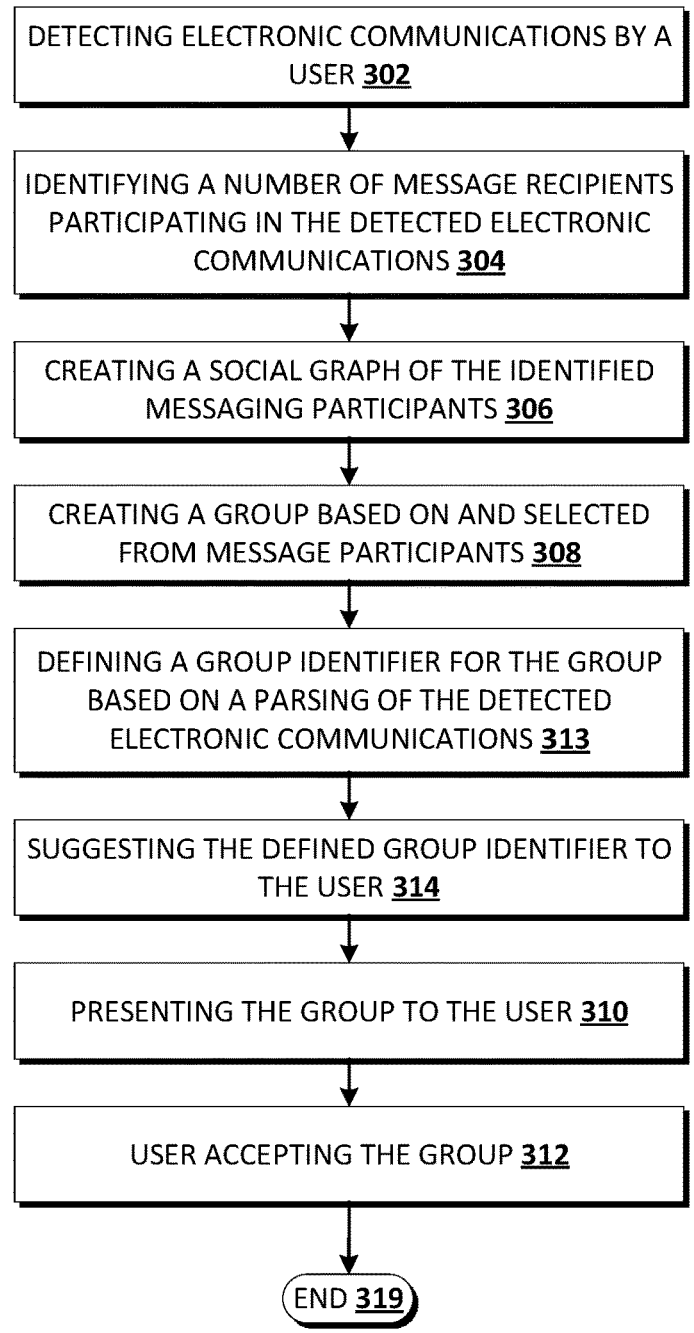
FIG. 3 is a flow chart depicting a method using the system shown in FIG. 1 according to an alternate embodiment of the present disclosure.

Referring to FIGS. 1, 2, 3, in one embodiment according to the disclosure, a system 15, and a method 300 referring to the system 15, groups users communicating on an electronic communications platform. For example, users who frequently exchange electronic mail messages (email) over the electronic communications platform are placed in an email mailing list for future correspondence. A meaningful email mailing list can consist of contacts who frequently appear in the user's email (either as a sender or recipient). The electronic communications platform can be a device, system or service that facilitates the transmission of electronic communications 106. The electronic communications 106 can be communications or transfers of writing, images, sounds, data or intelligence of any nature transmitted in whole or in part by the electronic communications platform. The electronic communications 106 can include different types of communications using various formats such as a text message using short message service (SMS), or a multimedia message or a message including multimedia content using multimedia messaging service (MMS), or an email using electronic mail.

In one embodiment, the method 300 detects electronic communications 106 by an initiating user or user 101 at block 302. The initiating user 101 uses a computing device 116 to send and receive the electronic communications 106. The initiating user 101 can use a number of electronic devices for communications. In the embodiment show in FIG. 1, for example, the user computing device 116 can be a mobile, laptop or desktop computer and can contain a messaging application 102. The messaging application 102 can be located locally or on a server. The messaging application 102 can be any software application capable of transmitting electronic communications 106 to or from the user computing device 116 over an electronic communication system. In this embodiment, the electronic communication system is the communications network 220. The communications network 220 allows the initiating user 101 to communicate with other users e.g., message recipients 103, and may use a server 222. The message recipients 103 and the messaging recipient computing device 118 (as shown in FIG. 1) are representative of one or more message recipients or other users communicating with the initiating user 101. In this example, the server 222 is remote with respect to the initiating user 101 and the other users 103. The other users or message recipients 103 can transmit electronic communications 106 using a message recipient computing device 118. The messaging recipient computing device 118 can contain the same components as the user computing device 116, and is representative of a device for one or more message recipients 103.

Figure 7:
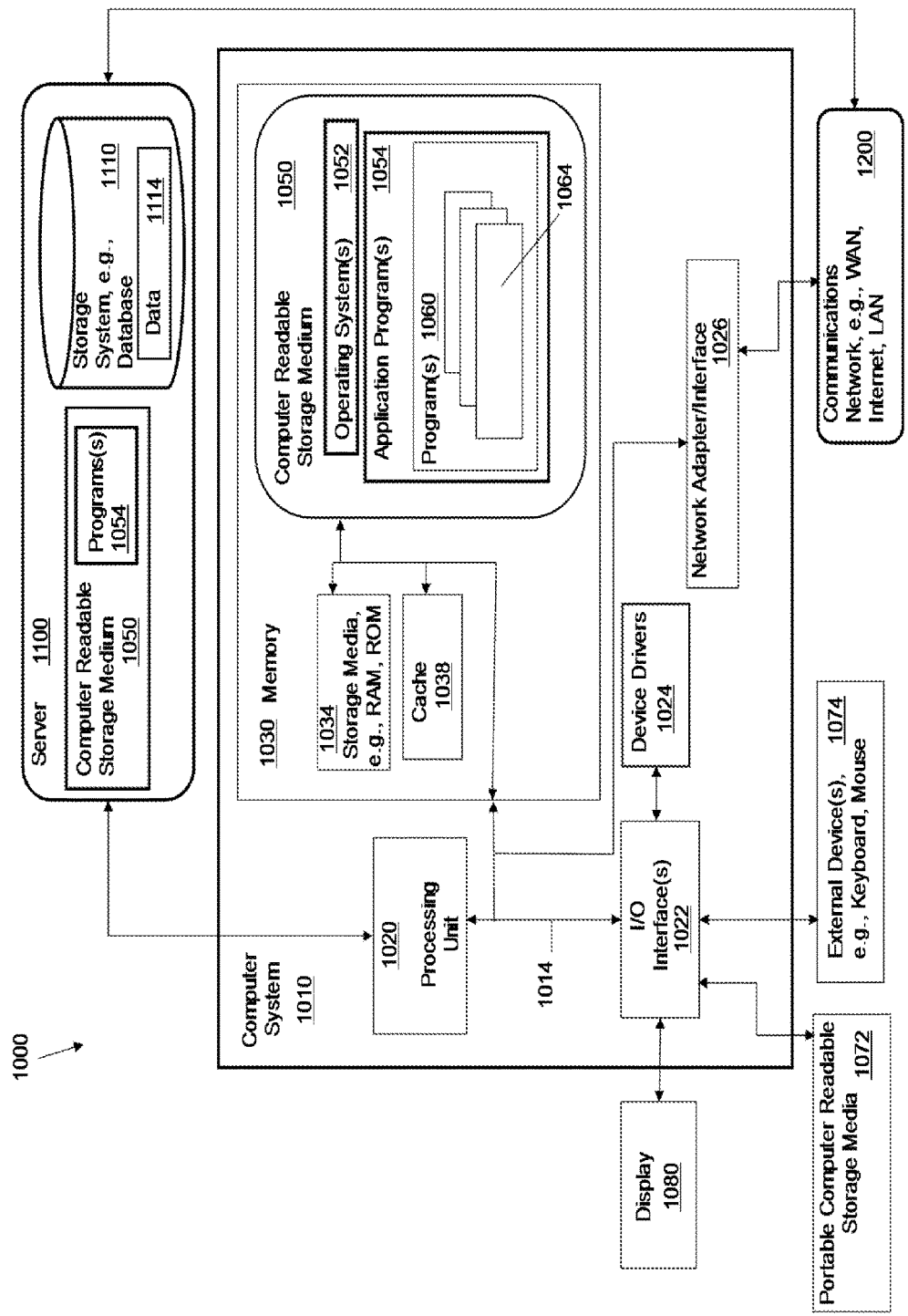
FIG. 7 is a schematic block diagram depicting a computer system according to an embodiment of the disclosure which includes a more detailed depiction of a computer (shown generally in FIG. 1) and which cooperates with the system and methods shown in FIGS. 1, 2 and 3.

It is understood that the server 222, the user computing device 116, and the messaging recipient computing device 118 are representative or illustrative of many alternative computer devices and are presented here as generic representations for the purposes of the embodiment(s) of the present invention. In the embodiment discussed below, for illustrative purposes, the method of the present disclosure can be embodied in a computer program 1060 (FIG. 7) which is a software application stored on a computer 1010, or stored on another storage device communicating such as the server 222 and communicating with the computer 1010 and thus the user computers 116, 118 (also can be referred to as client computers). The client computers can each include a computer system, generically represented as computer 1010. The server 222 and the client computers can communicate with each other using the communications network 220 (e.g. the Internet). The method can also be provided as a service, for instance using a remote server exemplified by the remote server 1100 (FIG. 7).

Continuing with the method 300 depicted in the flow chart shown in FIG. 2, a number of message recipients 103 participating in the detected electronic communications 106 are identified at block 304. The method includes detecting when an electronic communication 106 is sent by the initiating user 101 and when the user 101 receives a message, thus as a sender or recipient. The message recipient(s) 103 are persons included in the detected electronic communications 106 by a cognitive analysis 108. The persons participating in the detected electronic communications 106 can include other users 103.

The method includes creating a social graph 110 of the identified message recipients 103 based on the cognitive analysis 108 of the electronic communications at block 306. The identified message recipients 103 are referred to as stored message recipients 114 in the social graph 110 based on being included in the electronic communications 106. The social graph 110 is the resulting output of the cognitive analysis 108 of the initiating user's 101 electronic communications 106. The cognitive analysis 108, can include any number of application programming interfaces (APIs). An API specifies how software components should interact with each other to achieve a desired result or output. According to one embodiment of the present invention, APIs are programmed to group stored message recipients 114 together based on electronic communications 106 between the stored message recipients 114. The social graph 110 may be based on a number of criteria such as: a determination that the user 101 is a sender or a recipient in the detected electronic communications 106; grouping recipients on emails sent by the initiating user 101; the initiation of an email thread including the initiating user 101; carbon copying a person as a recipient of an email. The social graph 110 may also be based on a determination that stored message recipients 114 appear in the same detected electronic communications 106. Two stored message recipients 114 can have a stronger link to each other based on the frequency at which they appear together in electronic communications 106. This frequency determination will be discussed below regarding FIG. 5.

The method includes updating the social graph 110 based on the user 101 including a new message recipient 103 in the electronic communication 106, as in block 307. In one example, the user 101 can send an email to a person for the first time. The messaging application 102, can repeat the identification of the message recipients 103 participating in the detected electronic communications 106. The method can include the new person in the social graph 110 as a stored message recipient 114 and proceed to block 308.

Although not pictured, the method can generate a list of the stored message recipients 114 using the social graph 110. The list can be based on the stored message recipients 114 being repeatedly included in the electronic communications 106. The method can detect trends in who receives and sends the electronic communications 106. These stored message recipients 114 can be part of the list and the list can be used for grouping or clustering users for ease of future correspondence with the user 101.

In one example, the user 101 can confirm the list of stored message recipients 114 prior to the creation of a group 112 (as shown in FIG. 1). The list may be presented to the user in the form of a pop-up message or prompt. After the user 101 confirms the list of stored message recipients 114, the group 112 can be created at block 308 using the list.

The method 300 includes creating the group 112 in an electronic communications platform used by the user as in block 308. The group 112 is selected from the message recipients 103 and based on the social graph 110 of the stored message recipients 114. The group 112 is selected from the message recipients 103 and based on the social graph 110 of the stored message recipients 114. This results in a selection of the most relevant message recipients 103. In this embodiment, the method can present the group 112 to the user at block 310. The group 112 can be presented to the user 101 using a graphical user interface (GUI) on the user computing device 116. The group is presented to the user for routing the electronic communication 106 to the group. The user 101 can accept the group 112 as currently composed at block 312. The method can send the electronic communication 106 to the group 112 in response to the user 101 accepting the presented group 112 at block 316. The electronic communication can be (as discussed previously), for example (but not limited to), a text message, a multimedia message, or an email.

The group 112 can later be updated to add new contacts or to remove contacts that no longer interact with the user 101. The method can end at block 319.

An alternative method 380 according to an alternative embodiment of the present invention is shown in FIG. 3. In this embodiment, the method 380 proceeds through the steps of blocks 302-308 similarly to the method 300 shown in FIG. 2. However, at block 313 of the method 380, a group identifier is defined for the group 112 based on a parsing of the detected electronic communications 106 (at block 302). Instead of presenting the group to the user at block 310 as in the method 300 shown in FIG. 2, the method 380 defines a group identifier for the group 112. The cognitive analysis 108 can use a natural language understanding service to define the group identifier. The natural language understanding service can analyze text in the electronic communications 106 in order to recognize and define a relation between the message recipients 103. Based on the identified relation, the natural language understanding service can determine a string of text to identify the group 112. In this example, the method automatically defines a group identifier for the group 112. In another embodiment, the user can manually create the group identifier. The method can present the suggested group identifier to the user for approval at block 314. The method can present the group to the user at block 310. The user can accept the group at block 312 and end at block 319.

Figure 4:
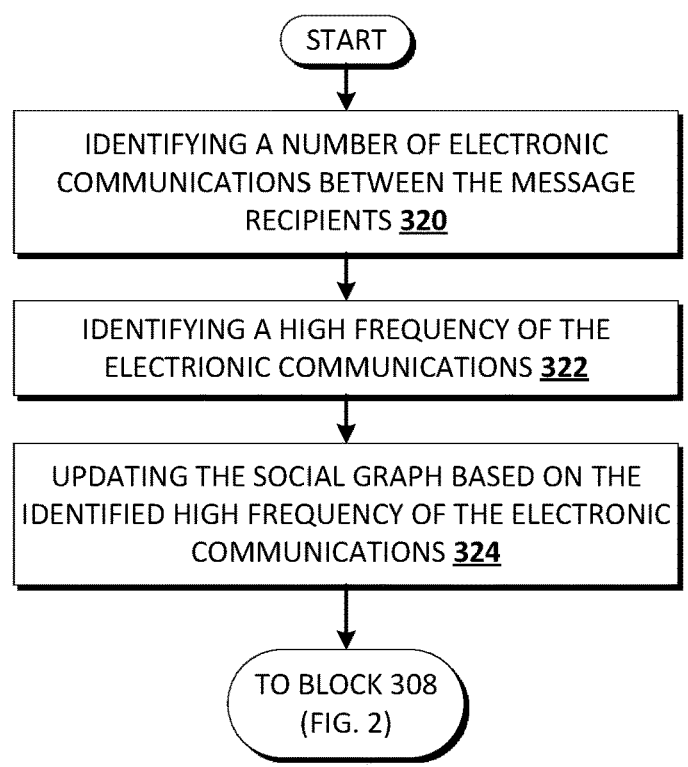
FIG. 4 is a flow chart which continues from the flow chart shown in FIG. 2.

Referring to FIGS. 1 and 4, another alternative method 350 according to an embodiment of the present invention has different starting steps than the method 300 shown in FIG. 2, and includes indicating a strength of the connection between the message recipients 103. The method 350 can identify a number of electronic communications 106 between the message recipients 103 at block 320. The method can identify a high frequency of the electronic communications 106 using the cognitive analysis 108 at block 322, based on the frequency message recipients communicate in electronic communications. The high frequency of electronic communications, in one example, can include a numerical tally of the number of the electronic communications 106 between the message recipients 103 as determined by the cognitive analysis 108. A threshold number or above of electronic communications can indicate a high frequency of electronic communications and thereby be used to determine a high frequency of electronic communications. At block 324, the method can update the social graph 110 based on the identified high frequency of the electronic communications 106. The method can then proceed to block 308 of the method 300 shown in FIG. 2 and continue performing the method steps.

Figure 5:
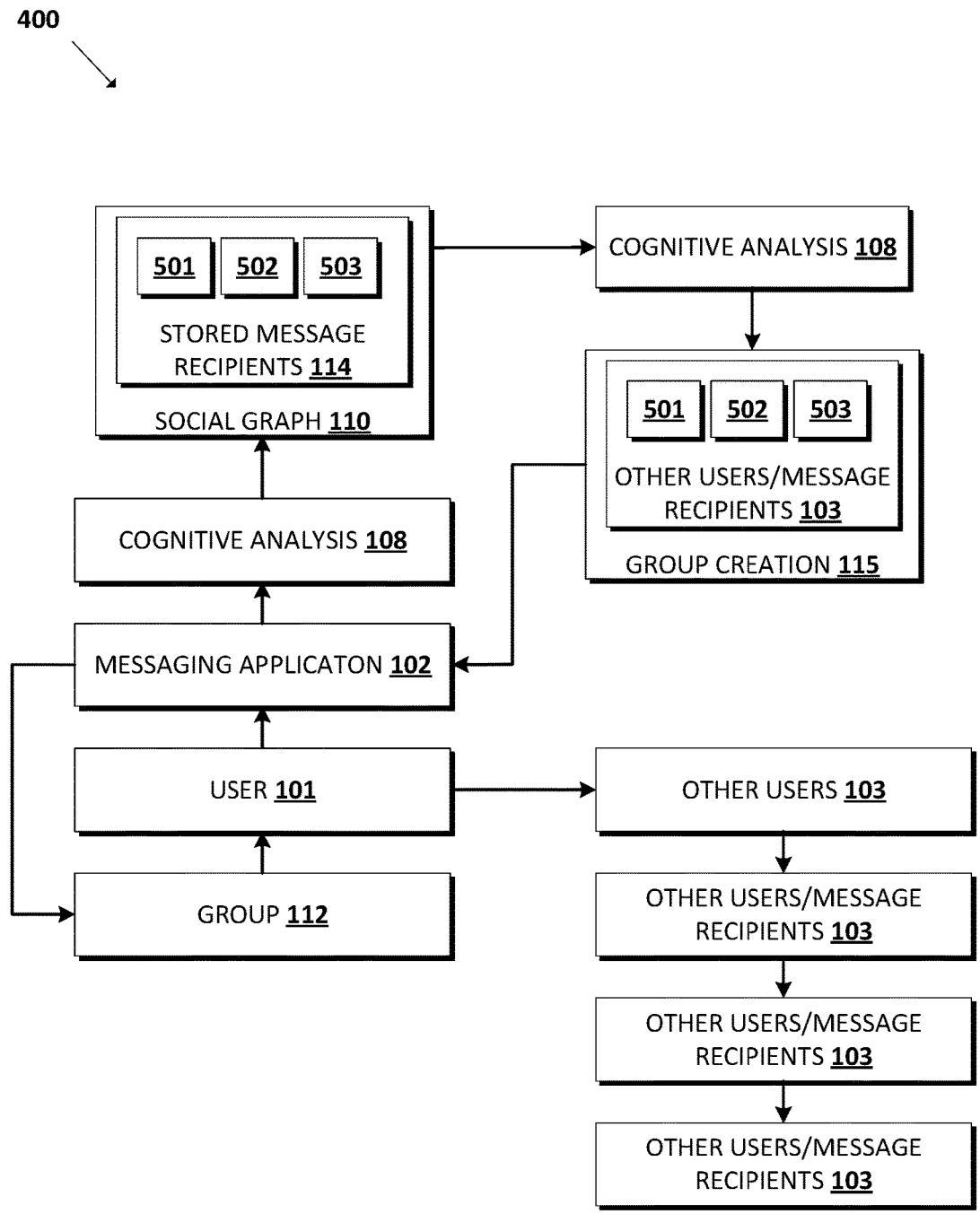
FIG. 5 is a functional block diagram illustrating an embodiment according to the present disclosure based on the system and method shown in FIGS. 1 and 2.

Referring to FIGS. 1 and 5, an embodiment of the method 400, is depicted according to aspects of the invention. The method includes detecting electronic communications 106 by a user 101 and identifying message recipients 103 in the detected electronic communications 106. The user 101 and other users 103 transmit electronic communications 106 using a messaging application 102. As previously described, the messaging application 102 can be a software application capable of transmitting electronic communications 106. In one example, the user 101 sends and receives an electronic communication 106 to/from other persons, depicted generally as other users/message recipients 103.

A cognitive analysis 108 can identify a number of message recipients 103 in the detected electronic communications 106 between the user 101 and the other users 103. Based on this identification, a social graph 110 is created. The social graph 110 can display the user 101 as well as a number of stored message recipients 114, who have transmitted electronic communications 106 to each other based on pre-determined criteria. In this example, the determining criteria is the frequency of inclusion of the stored message recipients 114 (depicted as 501, 502, 503, respectively) in the electronic communications 106. The method can update the social graph 110 based on the user 101 including a new message recipient 103 in an outgoing electronic communication 106.

A group creation 115 can create a group 112 of message recipients 103. The message recipients 103 are individually represented as 501, 502, 503 based on the social graph 110. The group creation 115 is linked to the messaging application 102 to allow the user 101 to communicate with the group 112. The group 112 members can include the user 101, as well as a number of other users/message recipients 103. The message recipients 103 are selected for the group 112 based on the sending and receiving of electronic communications 106 with the user 101. Where the primary criteria for group selection is the frequency of inclusion of message recipients 103 in the electronic communications 106, the group 112 includes those message recipients 103 who are included in the electronic communications 106 with the greatest frequency.

The cognitive analysis 108 can define and present the group 112 to the user 101 for acceptance, as indicated in block 310 of FIG. 2. The user 101 can route future electronic communications to the group 112 directly instead of individual group members. The user can accept the group 112 members and manually define a group identifier. Alternatively, the user 101 can allow the method to automatically define the group identifier as described above.

Figure 6:
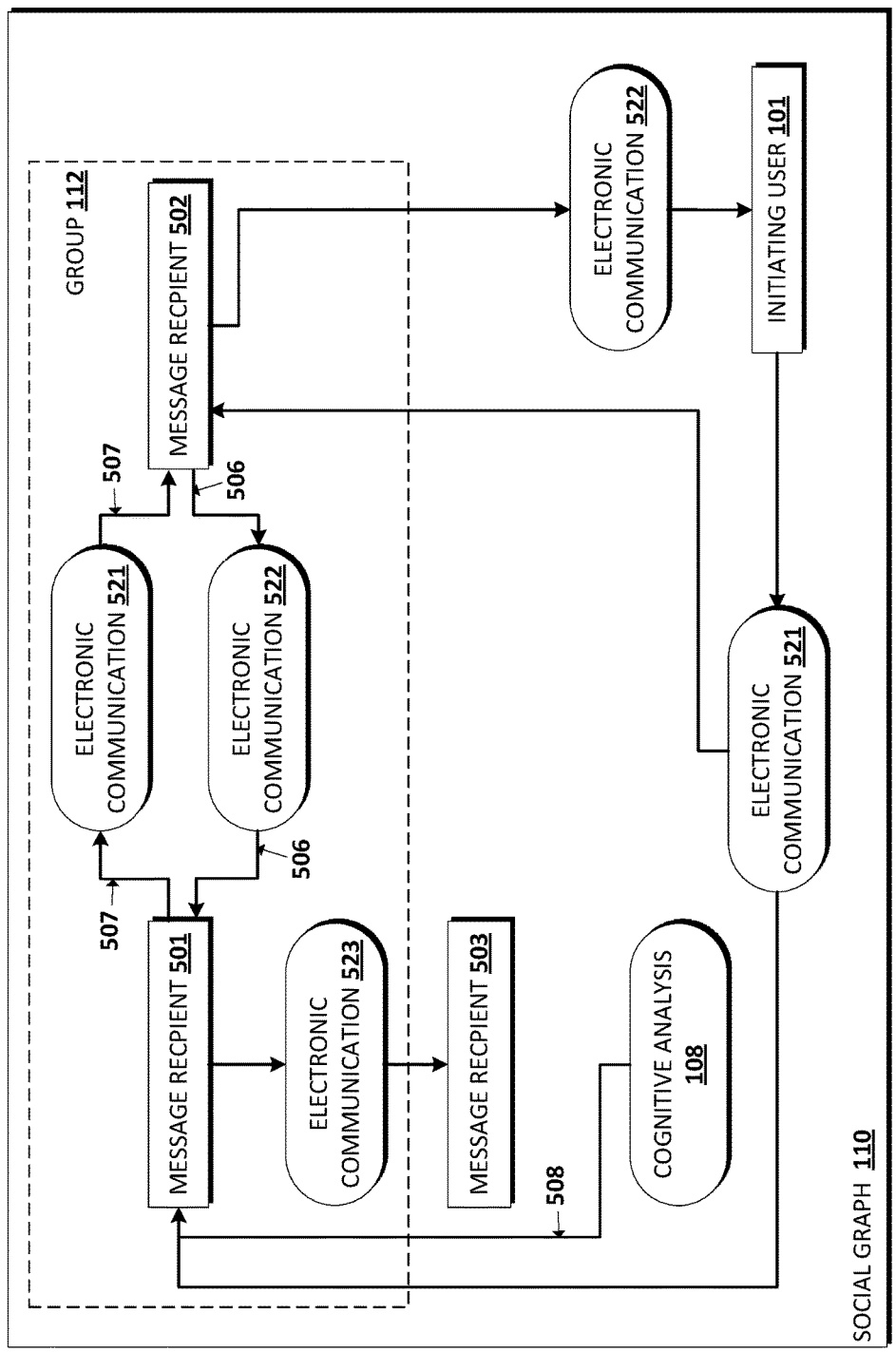
FIG. 6 is a functional block diagram depicting an example of a social graph, according to an embodiment of the disclosure.

An embodiment of a social graph 110, according to an embodiment of the present invention is shown in FIG. 6. The social graph 110 is a visual display of the connection between message recipients having electronic communications. The social graph 110 includes a cognitive analysis 108. The cognitive analysis 108 can determine a number of message recipients from a number of electronic communications and group them for easier correspondence with an initiating user 101 (or user) 101. In this example, a number of message recipients are represented as message recipient 501, message recipient 502 and message recipient 503. A number of electronic communications are represented as electronic communications 521, electronic communication 522 and electronic communication 523. The cognitive analysis 108 is accessible by each of the message recipients. Links between the cognitive analysis 108 and each message recipient is formed and represented by a depicted link 508 between the cognitive analysis 108 and the message recipient 501. The links between the cognitive analysis and the message recipients represent an analysis of the message recipients' interconnectedness based on their communications with each other. The method and system of the present invention uses the cognitive analysis 108 to update the social graph 110 and the group 112 based on the connections between the message recipients.

In this example, the initiating user 101, message recipient 501 and message recipient 502 have transmitted electronic communications to each other. The initiating user 101 has sent electronic communication 521 to message recipient 501, and message recipient 502, or message recipient 501 has forwarded electronic communication 521 to message recipient 502. Message recipient 502 has also sent electronic communication 522 to message recipient 501 or replied to the electronic communications of message recipient 501. Message recipient 502 has also sent electronic communication 522 to the initiating user 101. The two message recipients have transmitted a total of two electronic communications to each other. The cognitive analysis 108 can group the two message recipients as shown in group 112. In the current embodiment, the connections between message recipient 501 and message recipient 502 are represented by 506 and 507. These connections are based on the two electronic communications that the message recipients have transmitted to each other. Because there are two electronic communications between the message recipients, they have a strong connection and are thus grouped together in a group 112 of the social graph 110 using the cognitive analysis.

The aforementioned connection can be compared to the connection between message recipient 501 and message recipient 503. In this example, message recipient 501 has sent an electronic communication (depicted as electronic communication 523) to message recipient 503. There is only one electronic communication between message recipient 501 and message recipient 503. The cognitive analysis 108 may not group the message recipients together because the connection is not as strong as that between message recipient 501 and message recipient 502.

As described above, the method and system of the embodiments described herein can include a plurality of devices. The devices can each contain a messaging application. The devices may be connected via an Internet network. The network can use the messaging application to transmit electronic communications between devices. The electronic communications can be analyzed to determine recurring participants in the electronic communications. The participants can be placed in a social graph. The social graph can be created based on a detected number of message recipients.

In one example, the method and system of the present disclosure analyzes a user's email correspondence. Patterns are recognized among the participants of the email messages. Participants appearing on the same email message are considered "connected." The method and system can then construct a social graph with these connections, where the participants are the nodes of the graph and the edges represent their connectedness. A number of factors can be used to determine connectedness. At the most basic level, any two people appearing in the same email thread become connected; and if those people also appear together in other threads, their connection strength is increased. In other words, the connection strength represents a count of the number of times the participants appear together in email correspondence. The invention improves the quality of the social graph using a number of heuristics that further strengthen or weaken connections. Examples include: the frequency of participation on a chain of emails, cliquing recipients on emails sent by the current user, initiation of an email thread, direct vs. indirect addressing of a person as a recipient of the email (i.e. to vs. carbon copy (cc)).

Participants can be separated into groups using clustering and/or grouping algorithms. Clustering is the task of grouping a set of objects (in this case participants) in way that a grouping called a cluster contains objects that are similar to each other as compared to other clusters. An example of clustering is k-means. K-means clustering can partition a number of observations into a number of clusters.

Where multiple electronic communications are transmitted to the same group of participants, the invention can suggest creating a team element for the group of participants. This team element allows future conversations to be started easily. Each team element is treated as an object. In one example, the team element can be a mailing list, or a code construct representing the group of people that the team consists of. The present disclosure makes use of this construct in various ways; the user could interact with this construct as if they were a mailing list, for example, or perform a search for all messages from the team.

Referring to FIG. 7, a system 1000 includes a computer system or computer 1010 shown in the form of a generic computing device. The method 300, for example, may be embodied in a program(s) 1060 (FIG. 7) embodied on a computer readable storage device, for example, generally referred to as memory 1030 and more specifically, computer readable storage medium 1050 as shown in FIG. 7. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g. interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 7 as program modules 1064. The program 1060 and program modules 1064 can execute specific steps, routines, sub-routines, instructions or code, of the program.

The method of the present disclosure can be run locally on a device such as a mobile device, or can be run as a service, for instance, on the server 1100 which may be remote and can be accessed using the communications network 1200. The program or executable instructions may also be offered by a service provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 7, the system 1000 includes the computer system shown in the form of a general purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and or/cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 300 FIG. 2, for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with computer 1010; and/or any devices (e.g., network card, modem, etc.) that enables the computer 1010 to communicate with one or more computing devices. Such communication can occur via the Input/Output (I/O) interfaces 1022. Still yet, the computer 1010 can communicate with one or more networks 1200 such as local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later depicted.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g. mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g. cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
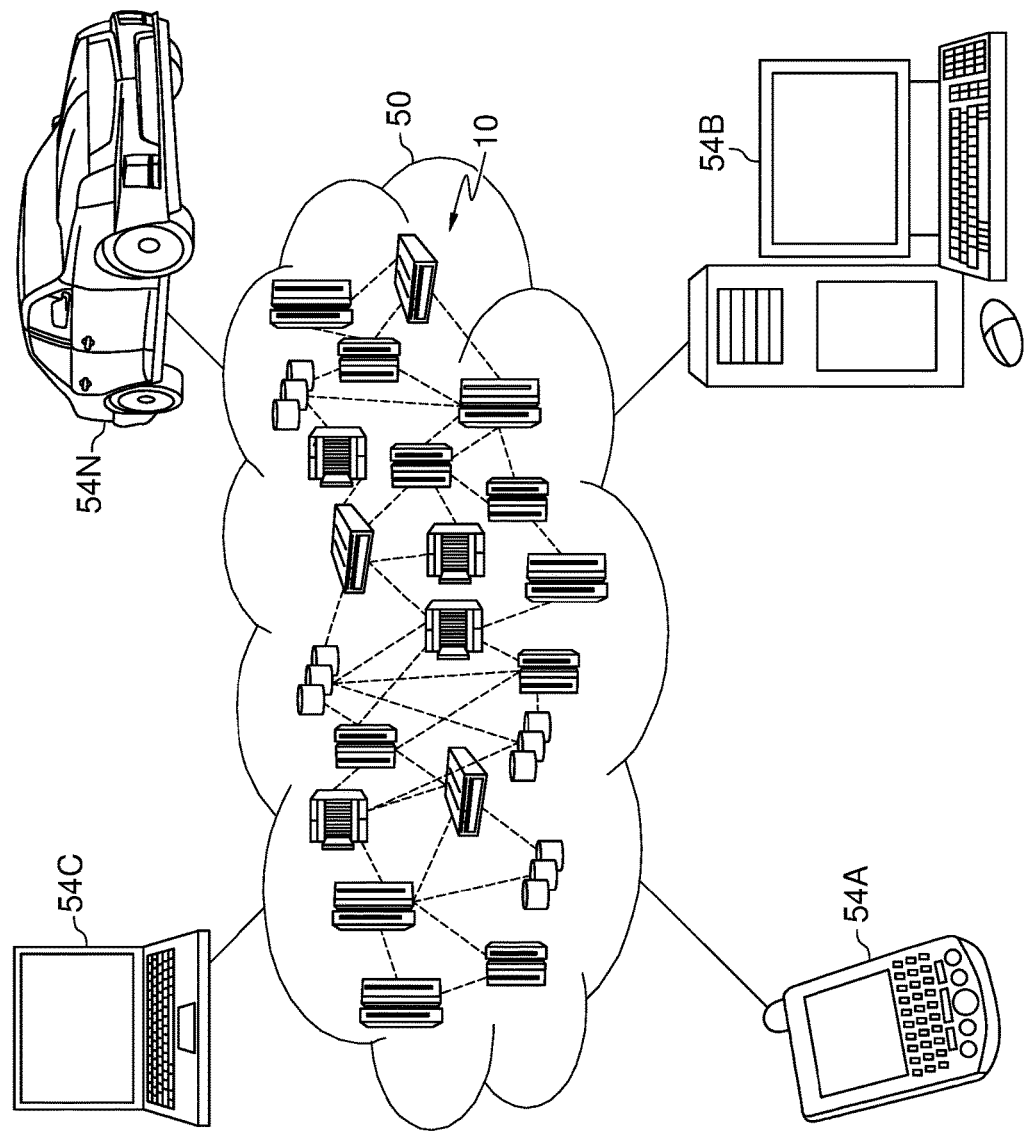
FIG. 8 depicts a cloud computing environment according to an embodiment of the present invention.

Referring now to FIG. 8, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid cloud as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 9:
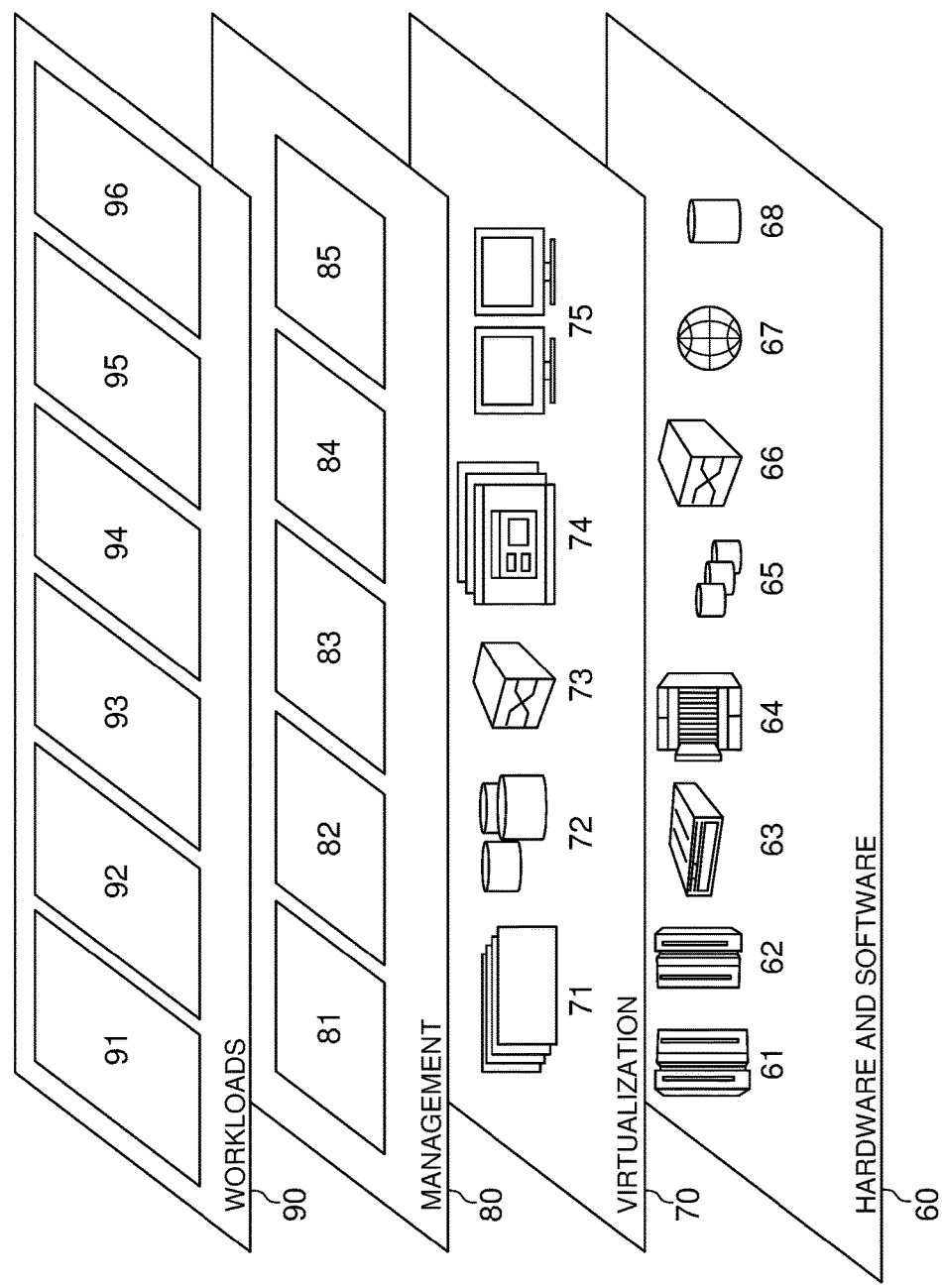
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61, RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73; including virtual private networks; virtual applications and operating systems 74; and virtual clients 75.

In one example management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and 96 grouping users in electronic communications.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only (CD-ROM), a digital versatile disk (DVD), a memory stick, a floppy disk, a mechanically encoded device such as punch-cards or raised structures in a groove having instructions recorded thereon, and any suitable combination foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and party on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devise to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the function/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the function noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for grouping users communicating on an electronic communications platform, comprising:
   detecting electronic communications by a user using a device having a computer, the device being connected to an electronic communication system for communicating with other users;
   identifying message recipients participating in the detected electronic communications;
   creating a social graph of the message recipients using a cognitive analysis of the electronic communications, the social graph being based on the identification of the message recipients and criteria, the criteria including a frequency of inclusion of message recipients in the electronic communications, wherein the social graph indicates a strength of the connection between the message recipients, the strength of the connection being determined by:
      identifying a number of electronic communications between the message recipients; and
      identifying a high frequency of the electronic communications, the high frequency being a numerical tally of the number of electronic communications between the message recipients;
   updating the social graph based on the identified high frequency of the electronic communications;
   updating the social graph based on a new message recipient being included in a new electronic communication;
   creating a group of most relevant message recipients in an electronic communications platform used by the user, the group being selected from the message recipients and based on the social graph of the message recipients, wherein the social graph indicates the most relevant message recipients;
   defining a group identifier for the group based on a parsing of the detected electronic communications;
   suggesting to the user the defined group identifier; and
   presenting the group to the user, wherein the group is presented to the user for acceptance by the user and used for routing an electronic communication to the group.

* * * * *